(12) United States Patent
Hosokai et al.

(10) Patent No.: US 11,275,410 B1
(45) Date of Patent: Mar. 15, 2022

(54) PORTABLE INFORMATION DEVICE AND COVER DEVICE

(71) Applicant: Lenovo (Singapore) Pte. Ltd., Singapore (SG)

(72) Inventors: Tatsuya Hosokai, Kanagawa (JP);
Hiroaki Kinoshita, Kanagawa (JP);
Kazuya Tatsuno, Kanagawa (JP);
Tatsuya Ushioda, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/130,517

(22) Filed: Dec. 22, 2020

(30) Foreign Application Priority Data

Oct. 6, 2020 (JP) .............................. JP2020-169053

(51) Int. Cl.
*G06F 1/16* (2006.01)
(52) U.S. Cl.
CPC .......... *G06F 1/1681* (2013.01); *G06F 1/1616* (2013.01); *G06F 1/1656* (2013.01); *G06F 1/1698* (2013.01)

(58) Field of Classification Search
CPC .... G06F 1/1607; G06F 1/1616; G06F 1/1633; G06F 1/1641; G06F 1/166
See application file for complete search history.

(56) References Cited

U.S. PATENT DOCUMENTS 10,890,951 B1 * 1/2021 Watamura ............. G06F 1/1616
2019/0107695 A1 * 4/2019 Chen ..................... G06F 1/1616

FOREIGN PATENT DOCUMENTS

JP 2018-105961 A 7/2018

* cited by examiner

*Primary Examiner* — Anthony Q Edwards
(74) *Attorney, Agent, or Firm* — Osha Bergman Watanabe & Burton LLP

(57) ABSTRACT

A portable information device includes a chassis and a cover device to cover the back surface of the chassis. The cover device includes a hinge device that rotatably supports a stand cover section between a stored position and a standing position. The hinge device includes: a first shaft; a second shaft; an intermediate shaft having a first end coupled to one end of the first shaft and a second end coupled to one end of the second shaft; and a first base bracket, a first stand bracket, a second base bracket, and a second stand bracket.

9 Claims, 11 Drawing Sheets

PORTABLE INFORMATION DEVICE AND COVER DEVICE

TECHNICAL FIELD

The present invention relates to a portable information device having a cover device and the cover device.

BACKGROUND

A portable information device such as a laptop PC or a tablet PC is required to avoid damage or breakdown when being carried around. Further, it is desired that the appearance design and the sense of touch of the portable information device should be of high quality.

Therefore, a cover device may be mounted on the outer surface of the chassis of the portable information device for the purpose of protection or decoration. The applicant proposes a cover device for a foldable tablet PC in Japanese Unexamined Patent Application Publication No. 2018-105961.

As described in Japanese Unexamined Patent Application Publication No. 2018-105961, the cover device is required not only to simply cover the outer surface of the chassis, but also to be rotated as necessary so as to function as a stand for the device. The cover device of this type has a base cover section relatively fixed to the outer surface of the chassis, and a stand cover section to be rotated relative to this base cover section by using a hinge device.

The hinge device of this type is required to be able to operate stably without rattling while being miniaturized to fall without a plate thickness range of a thin plate-shaped cover device. Therefore, each of components of the hinge device is required to be miniaturized, and further a hinge shaft is required to have high straightness despite having a small diameter.

On the other hand, since a user holds and rotates the stand cover section with his or her fingertips during rotational operation, the stand cover section may be deformed such as some distortion or curvature. In this case, the hinge device can cause a rotational speed difference in the length direction thereof and hence cause noise due to rubbing or the like, for example, between brackets fixed to the chassis or the like and a hinge shaft.

SUMMARY

One or more embodiments of the present invention provide a portable information device including a cover device and the cover device capable of suppressing the occurrence of rattling or the generation of noise in the hinge device rotatably supporting a stand.

A portable information device according to the first aspect of the present invention includes a chassis, and a cover device provided to cover the back surface of the chassis, wherein the cover device includes: a base cover section provided along the back surface of the chassis; a stand cover section provided to be rotatable relative to the base cover section so as to be movable between a stored position where the stand cover section is set along the back surface of the chassis and a standing position where the stand cover section protrudes from the back surface of the chassis; and a hinge device which supports the stand cover section to be rotatable between the stored position and the standing position, the hinge device includes: a first shaft; a second shaft placed on an extension line of the axis of the first shaft; an intermediate shaft placed on the extension line of the axis between the first shaft and the second shaft, and having a first end coupled to one end of the first shaft and a second end coupled to one end of the second shaft; a first base bracket coupled to the first shaft and fixed relative to the base cover section; a first stand bracket coupled to the first shaft adjacently to the first base bracket and fixed to the stand cover section; a second base bracket coupled to the second shaft and fixed relative to the base cover section; and a second stand bracket coupled to the second shaft adjacently to the second base bracket and fixed to the stand cover section, one of the first base bracket and the first stand bracket is coupled to be rotatable around the axis of the first shaft, and the other is fixed to the first shaft, when the first base bracket is coupled to be rotatable around the axis of the first shaft, the second base bracket is also coupled to be rotatable around the axis of the second shaft, while when the first base bracket is fixed to the first shaft, the second base bracket is also fixed to the second shaft, or when the first stand bracket is fixed to the first shaft, the second stand bracket is also fixed to the second shaft, while when the first stand bracket is coupled to be rotatable around the axis of the first shaft, the second stand bracket is also coupled to be rotatable around the axis of the second shaft, and he intermediate shaft is such that the first end is mutually fixed to the one end of the first shaft, and the second end is coupled to be rotatable relative to the one end of the second shaft.

A portable information device according to the second aspect of the present invention includes a chassis and a cover device provided to cover the back surface of the chassis, wherein the cover device includes: a base cover section provided along the back surface of the chassis; a stand cover section provided to be rotatable relative to the base cover section so as to be movable between a stored position where the stand cover section is set along the back surface of the chassis and a standing position where the stand cover section protrudes from the back surface of the chassis; and a hinge device which supports the stand cover section to be rotatable between the stored position and the standing position, the hinge device includes: a hinge shaft; a first base bracket coupled to the hinge shaft and fixed to the base cover section; a first stand bracket coupled to the hinge shaft adjacently to the first base bracket and fixed to the stand cover section; a second base bracket coupled to the hinge shaft and fixed relative to the chassis; and a second stand bracket coupled to the hinge shaft adjacently to the second base bracket and fixed to the stand cover section, one of a set of the first base bracket and the second base bracket, and a set of the first stand bracket and the second stand bracket is coupled to be rotatable around the axis of the hinge shaft and the other is fixed to the hinge shaft, the stand cover section includes: a core material; a surface material laminated on the surface of the core material to form the surface of the stand cover section; and an end face treatment agent provided on an end face of an edge, to which the hinge device is connected, and obtained by curing a liquid coating agent, the core material has: a first recess provided on a back surface opposite to the surface, on which the surface material is laminated, to be open to the edge, and provided with the first stand bracket placed therein; and a second recess provided on the back surface to be open to the edge, and provided with the second stand bracket placed therein, and each of the first recess and the second recess has a chamfer-shaped portion at a corner of an opening to the edge.

A cover device according to the third aspect of the present invention is a cover device configured to cover the back surface of a chassis of a portable information device, including: a base cover section; a stand cover section provided to be rotatable relative to the base cover section; and a hinge device which supports the stand cover section to be rotatable relative to the base cover section, wherein the hinge device includes: a first shaft; a second shaft placed on an extension line of the axis of the first shaft; an intermediate shaft placed on the extension line of the axis between the first shaft and the second shaft, and having a first end coupled to one end of the first shaft and a second end coupled to one end of the second shaft; a first base bracket coupled to the first shaft and fixed relative to the base cover section; a first stand bracket coupled to the first shaft adjacently to the first base bracket and fixed to the stand cover section; a second base bracket coupled to the second shaft and fixed relative to the base cover section; and a second stand bracket coupled to the second shaft adjacently to the second base bracket and fixed to the stand cover section, one of the first base bracket and the first stand bracket is coupled to be rotatable around the axis of the first shaft, and the other is fixed to the first shaft, when the first base bracket is coupled to be rotatable around the axis of the first shaft, the second base bracket is also coupled to be rotatable around the axis of the second shaft, while when the first base bracket is fixed to the first shaft, the second base bracket is also fixed to the second shaft, or when the first stand bracket is fixed to the first shaft, the second stand bracket is also fixed to the second shaft, while when the first stand bracket is coupled to be rotatable around the axis of the first shaft, the second stand bracket is also coupled to be rotatable around the axis of the second shaft, and the intermediate shaft is such that the first end is mutually fixed to the one end of the first shaft, and the second end is coupled to be rotatable relative to the one end of the second shaft.

The above-described aspects of the present invention can suppress the occurrence of rattling or the generation of noise in a hinge device rotatably supporting a stand.

DETAILED DESCRIPTION

A portable information device and a cover device according to the present invention will be described in detail below with reference to the accompanying drawings by taking a preferred embodiment.

Figure 1:
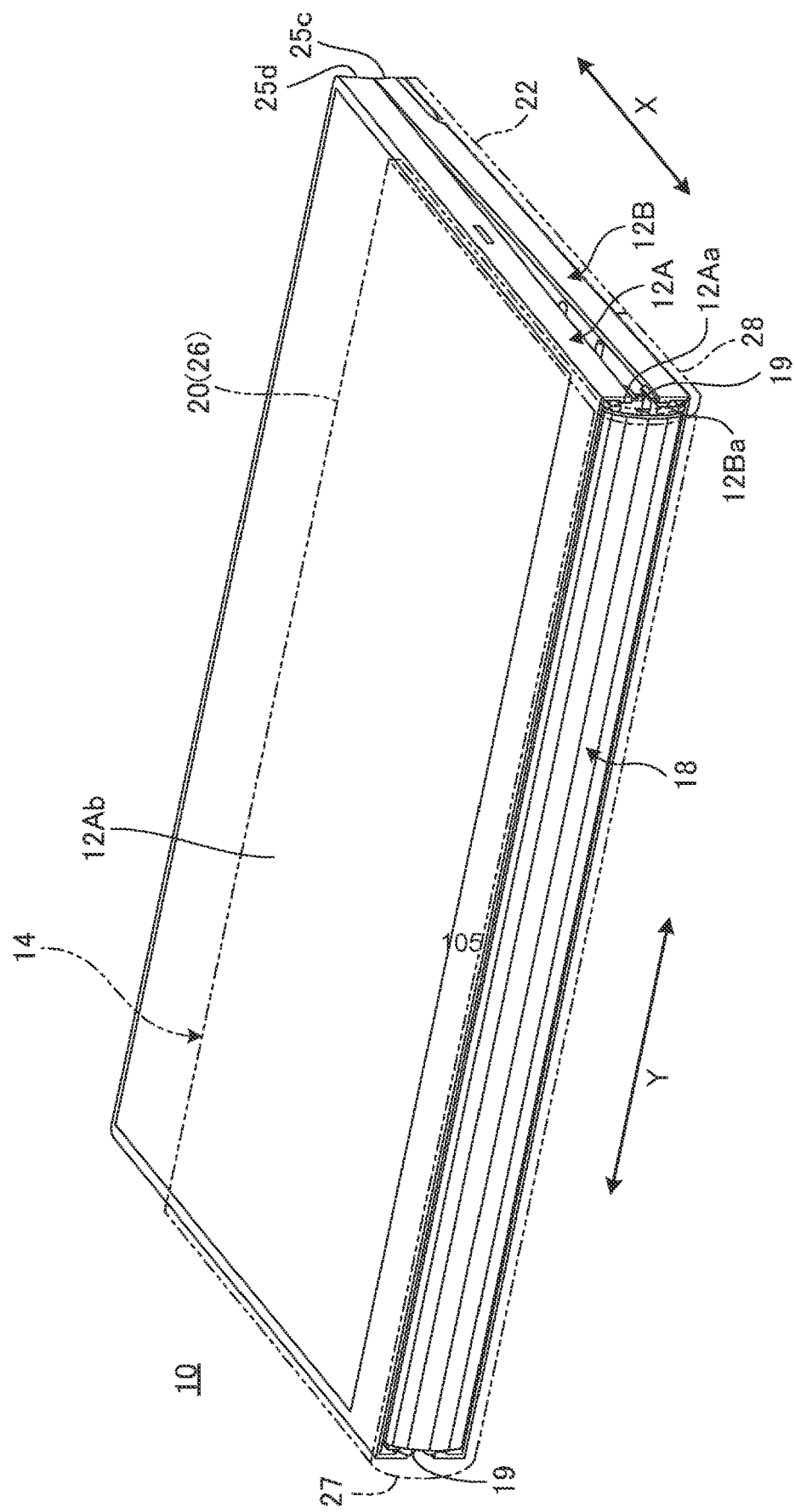
FIG. 1 is a perspective view illustrating a state where a portable information device according to one embodiment is closed and shaped into a folded form.
Figure 2A:
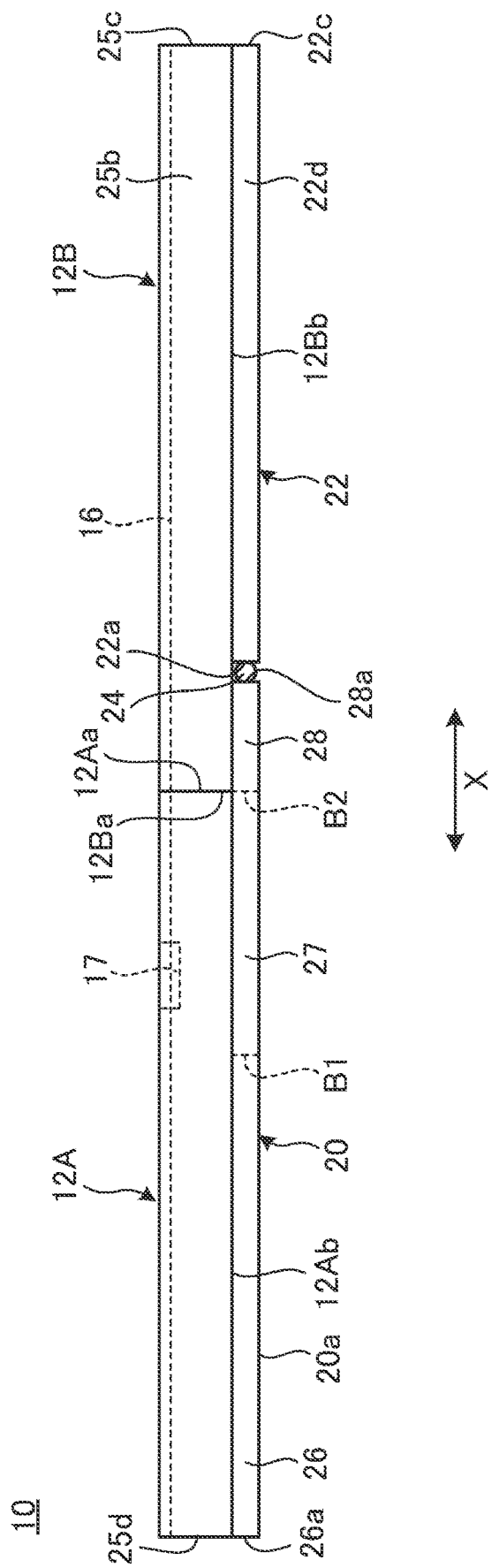
FIG. 2A is a side view schematically illustrating a state where the portable information device illustrated in FIG. 1 is opened and shaped into a flat plate form.
Figure 2B:
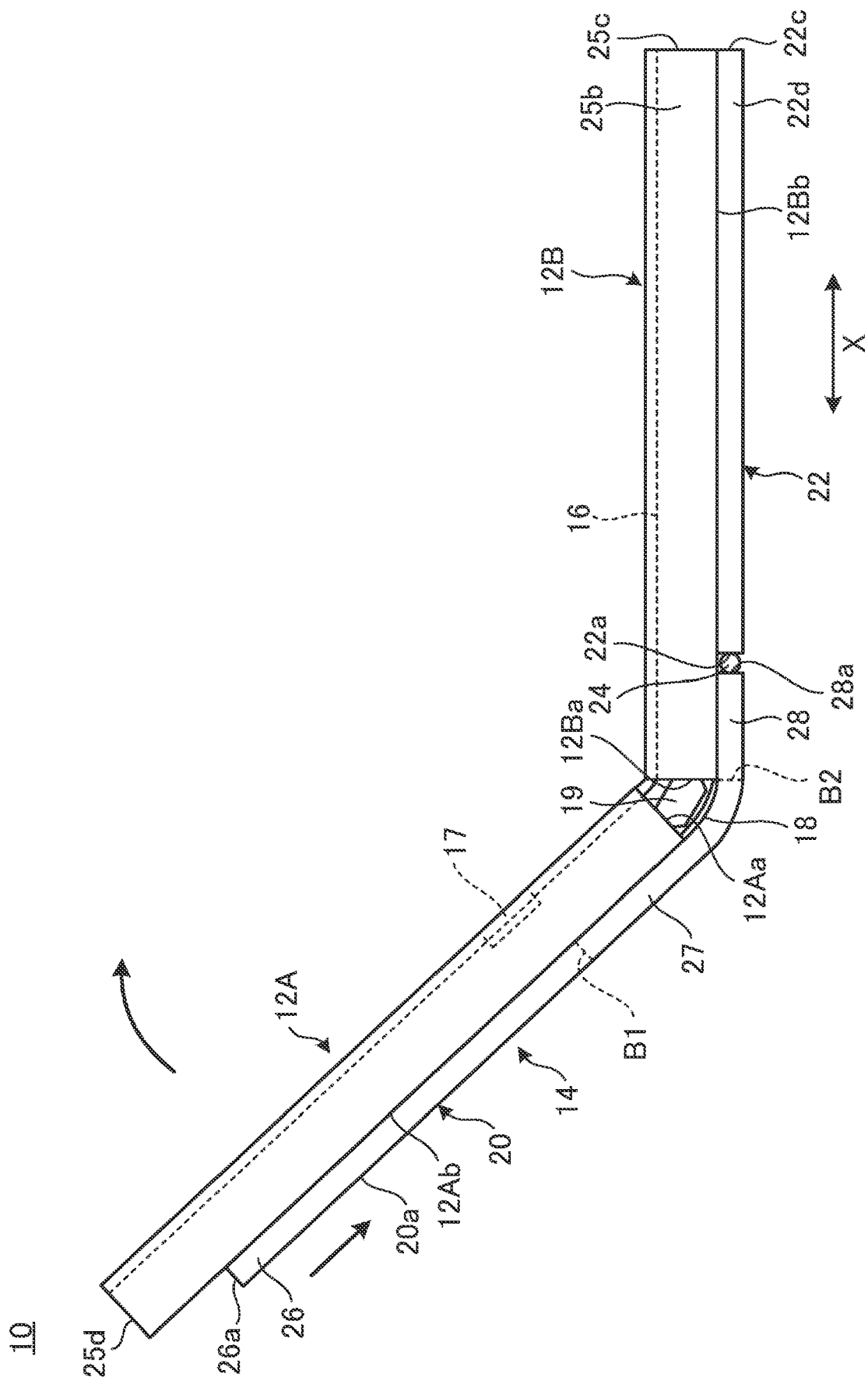
FIG. 2B is a side view in a state where the portable information device illustrated in FIG. 2A is shaped into a laptop form.
Figure 2C:
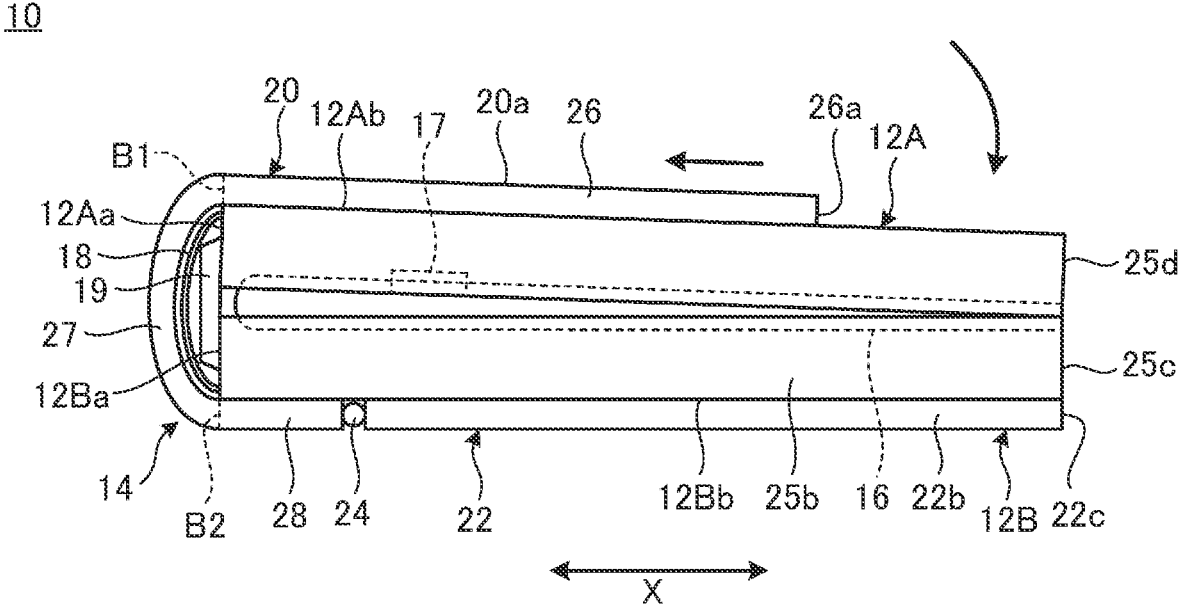
FIG. 2C is a side view in a state where the portable information device illustrated in FIG. 2B is closed and shaped into the folded form.

FIG. 1 is a perspective view illustrating a state where a portable information device 10 according to one embodiment is closed and shaped into a folded form. FIG. 2A is a side view schematically illustrating a state where the portable information device 10 illustrated in FIG. 1 is opened and shaped into a flat plate form. FIG. 2B is a side view in a state where the portable information device 10 illustrated in FIG. 2A is shaped into a laptop form. FIG. 2C is a side view in a state where the portable information device 10 illustrated in FIG. 2B is closed and shaped into the folded form.

As illustrated in FIGS. 1 to 2C, the portable information device 10 includes a first chassis 12A, a second chassis 12B, and a cover device 14. The portable information device 10 of the embodiment is a foldable tablet PC or laptop PC. The cover device 14 has a protection function to cover the outer surfaces of the chassis 12A and 12B in order to protect the chassis 12A and 12B, and a decoration function to decorate the outer surfaces in order to enhance the appearance design. The portable information device on which the cover device 14 is mounted may also be a common clamshell laptop PC, a single plate-shaped tablet PC, a smartphone, a portable game machine, or the like, as well as the portable information device 10.

First, the structure of the portable information device will be described. The portable information device 10 includes the chassis 12A, 12B and a display 16.

The chassis 12A and 12B are placed adjacent to each other. Adjacent edges 12Aa and 12Ba of the chassis 12A and 12B are covered internally with a spine member 18. Each of the chassis 12A and 12B is formed into a rectangular, plate-shaped member with side walls standing on three sides except the adjacent edge 12Aa, 12Ba, respectively. The chassis 12A, 12B is formed from a metal plate made of stainless steel, magnesium steel, aluminum steel, or the like, or formed from a fiber-reinforced plastic plate containing reinforced fiber such as carbon fiber.

The portable information device 10 as illustrated in FIG. 1 to FIG. 2C will be described below by expressing a line-up direction of the chassis 12A, 12B as an X direction and a direction orthogonal to the line-up direction along the adjacent edges 12Aa, 12Ba as a Y direction.

The adjacent edges 12Aa and 12Ba of the chassis 12A and 12B are coupled to each other through a pair of hinges 19, 19. The chassis 12A and 12B are coupled by the hinges 19 to be rotatable relative to each other between the flat plate form illustrated in FIG. 2A and the folded form illustrated in FIG. 2C. The hinges 19 can generate a predetermined rotation torque. Therefore, the chassis 12A and 12B are stabilized even in the laptop form (see FIG. 2B) in which the angle between the chassis 12A and 12B is about 90° to 140°. For example, the hinges 19 are disposed in both end portions of the adjacent edges 12Aa and 12Ba of the chassis 12A and 12B in the Y direction, and located outside of an outer peripheral edge of the display 16, respectively. The portable information device 10 of the embodiment is so set that the rotation center between the chassis 12A and 12B by the hinges 19 matches the surface of the display 16.

Inside of the respective chassis 12A and 12B, various electronic components and the like, such as a motherboard, various semiconductor chips like a CPU mounted on the motherboard, a communication module, a battery device, and a cooling device, are mounted. Reference numeral 17 in FIG. 2A to FIG. 2C denotes an imaging camera to face from an opening formed in a bezel surrounding the display 16 on the surface of the first chassis 12A.

The display 16 is, for example, a touch panel liquid crystal display. A band-shaped range of the display 16 extending in the Y direction across the adjacent edges 12Aa and 12Ba is a folding region. Thus, the display 16 is foldable together when the chassis 12A and 12B are folded, and opened and closed along with the opening/closing operation of the chassis 12A and 12B. The display 16 is, for example, a flexible display such as organic EL (Electro Luminescence) having a highly flexible paper structure or the like.

Figure 3:
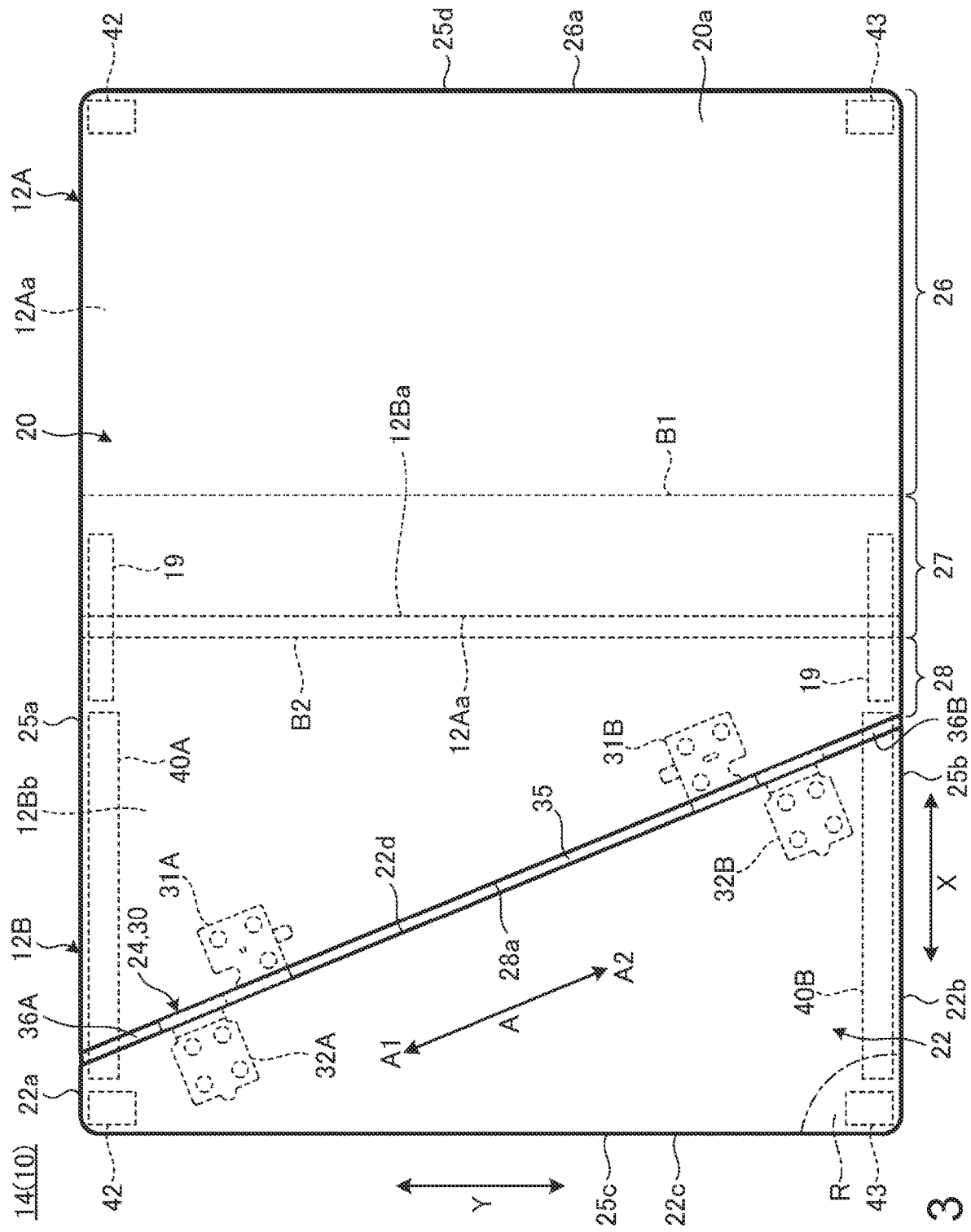
FIG. 3 is a plan view of the portable information device as viewed from the side of a cover device.

The overall structure of the cover device 14 will next be described. FIG. 3 is a plan view of the portable information device 10 as viewed from the side of the cover device 14.

As illustrated in FIG. 1 to FIG. 3, the cover device 14 is provided to cover the back surfaces 12Ab and 12Bb of the chassis 12A and 12B. In the flat plate form (see FIG. 2A), the cover device 14 covers the entire back surfaces 12Ab and 12Bb. In the laptop form and the folded form (see FIG. 2B and FIG. 2C), the cover device 14 covers most of the back surface 12Ab and the entire back surface 12Bb.

The cover device 14 includes a base cover section 20, a stand cover section 22, and a hinge device 24. The cover sections 20 and 22 extend in the X direction across the hinge device 24. In the external shape of the chassis 12A and 12B formed into rectangles, the cover sections 20 and 22 extend along a first side 25a and a second side 25b parallel with each other in the X direction. In the flat plate form, the cover sections 20 and 22 cover the entire back surfaces 12Ab and 12Bb as a whole, that is, cover the chassis 12A and 12B from an open edge (third side 25c) of the second chassis 12B to an open edge (fourth side g) of the first chassis 12A. The first side 25a and the second side 25b are outer edges orthogonal with the adjacent edges 12Aa and 12Ba. The third side 25c is an outer edge parallel with the adjacent edge 12Ba. The fourth side 25d is an outer edge parallel with the adjacent edge 12Aa.

The base cover section 20 has a slide cover section 26, a folding cover section 27, and a fixed cover section 28 in this order from the side of the first chassis 12A toward the side of the second chassis 12B.

The slide cover section 26 is a thin plate-shaped member provided to be slidable in the X direction relative to the back surface 12Ab of the first chassis 12A. In the flat plate form illustrated in FIG. 2A and FIG. 3, a distal edge 26a of the slide cover section 26 matches the fourth side 25d of the first chassis 12A. The distal edge 26a is located on the other side of a border line B1 with the folding cover section 27 in the X direction, which is an edge extending in the Y direction. In the laptop form and the folded form illustrated in FIG. 2B and FIG. 2C, the slide cover section 26 is slid to a position where the distal edge 26a is retreated from the fourth side 25d to the side of the adjacent edge 12Aa, respectively. The slide structure of the slide cover section 26 with respect to the first chassis 12A is not particularly limited. For example, a slide mechanism is so constructed that a slide part fixed to the first chassis 12A is coupled to a rail fixed to the slide cover section 26 to be slidable in the X direction.

The folding cover section 27 is provided in a position between the chassis 12A and 12B across the adjacent edges 12Aa and 12Ba, which is a band-shaped region narrow in the X direction and extending in the Y direction. The folding cover section 27 is connected to the slide cover section 26 to be foldable on the border line B1 along the Y direction on the side of the first chassis 12A. Then, the folding cover section 27 is connected to the fixed cover section 28 to be foldable on a border line B2 along the Y direction on the side of the second chassis 12B. The folding cover section 27 has flexibility as a whole to connect between the first cover section 26 and the fixed cover section 28 to be rotatable relative to each other. The folding cover section 27 is a flexible hinge to rotate the cover device 14 following the rotational operation between the chassis 12A and 12B. The folding cover section 27 is a folding region having a width dimension in the X direction to be able to cover the adjacent edges 12Aa and 12Ba of the chassis 12A and 12B at least in the folded form illustrated in FIG. 2C.

The fixed cover section 28 is a thin plate-shaped member to cover the back surface 12Bb of the second chassis 12B together with part of the folding cover section 27 and the stand cover section 22. The fixed cover section 28 is formed into a shape substantially line-symmetric with respect to the stand cover section 22, which is a substantially trapezoidal shape in plan view in the embodiment. The fixed cover section 28 is fixed relative to the back surface 12Bb of the second chassis 12B. The fixed cover section 28 of the embodiment is fixed directly to the back surface 12Bb. An edge 28a of the fixed cover section 28 on the other side of the border line B2 in the X direction is adjacent to the stand cover section 22 through the hinge device 24. The edge 28a is inclined in the X direction gradually toward the Y direction.

Figure 4:
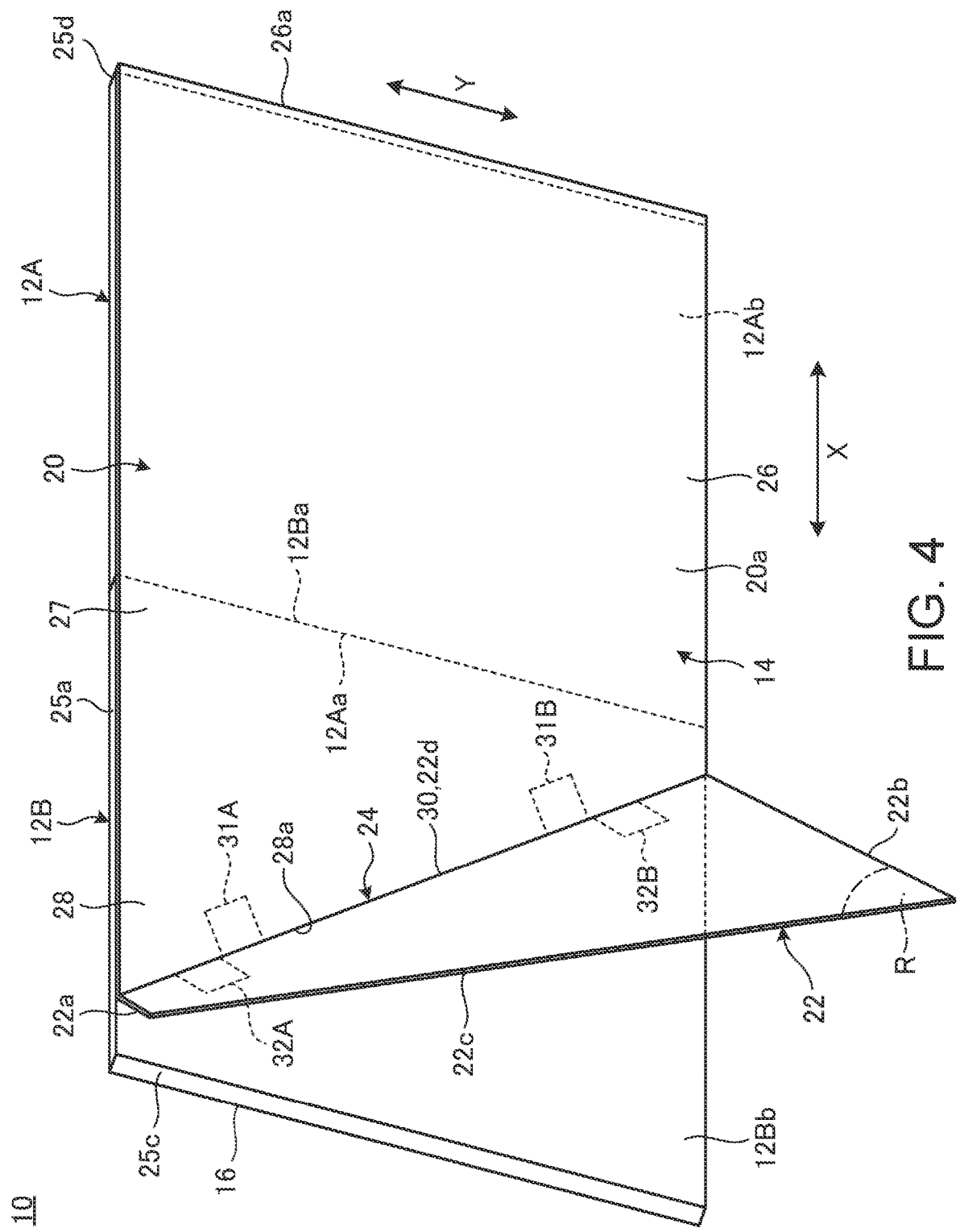
FIG. 4 is a schematic perspective view in a state where a stand cover section is set to a standing position to make the portable information device stand up.

FIG. 4 is a schematic perspective view in a state where the stand cover section 22 is set to a standing position to make the portable information device 10 stand up. As illustrated in FIG. 4, the stand cover section 22 is provided to be rotatable relative to the fixed cover section 28 of the base cover section 20 and the back surface 12Bb of the second chassis 12B. The stand cover section 22 of the embodiment is coupled to the back surface 12Bb of the second chassis 12B through the hinge device 24.

As illustrated in FIG. 2A to FIG. 4, the stand cover section 22 is formed into a shape substantially line-symmetric with respect to the fixed cover section 28, which is a substantially trapezoidal shape in plan view in the embodiment. The stand cover section 22 is so provided along the X direction that a first edge 22a and a second edge 22b as a trapezoidal top and a trapezoidal bottom match the first side 25a and the second side 25b of the second chassis 12B, respectively. A third edge 22c provided along the Y direction to connect between both ends of the edges 22a and 22b on the side of the third side 25c matches the third side 25c. A fourth edge 22d provided to connect between both ends of the edges 22a and 22b on the sides of the first side 25a and the second side 25b is inclined with respect to the X-Y directions. The fourth edge 22d is adjacent to the edge 28a of the fixed cover section 28 across the hinge device 24. The hinge device 24 is connected to this fourth edge 22d.

By rotational operation of the hinge device 24, the stand cover section 22 can move from a stored position(0°) where the third edge 22c abuts against the back surface 12Bb in a direction away gradually from the back surface 12Bb. The third edge 22c can move up to a position(180°) at which the third edge 22c abuts against a surface 20a of the base cover section 20 and further movement is restricted. Thus, the stand cover section 22 can move between the stored position (see FIG. 2A and FIG. 3) where the stand cover section 22 is set along the back surface 12Bb, and the standing position (for example, see FIG. 4) where the stand cover section 22 protrudes from the back surface 12Bb.

As illustrated in FIG. 4, the stand cover section 22 is set to a proper angle (standing position) with respect to the fixed cover section 28 to function as a stand so that the portable information device 10 in the flat plate form can be kept in a standing position. In the standing position, the second edge 22b of the stand cover section 22 abuts on a desk surface or the like so that the portable information device 10 can be kept in a predetermined standing posture fallen a little on the side of the back surfaces 12Ab and 12Bb.

Figure 5:
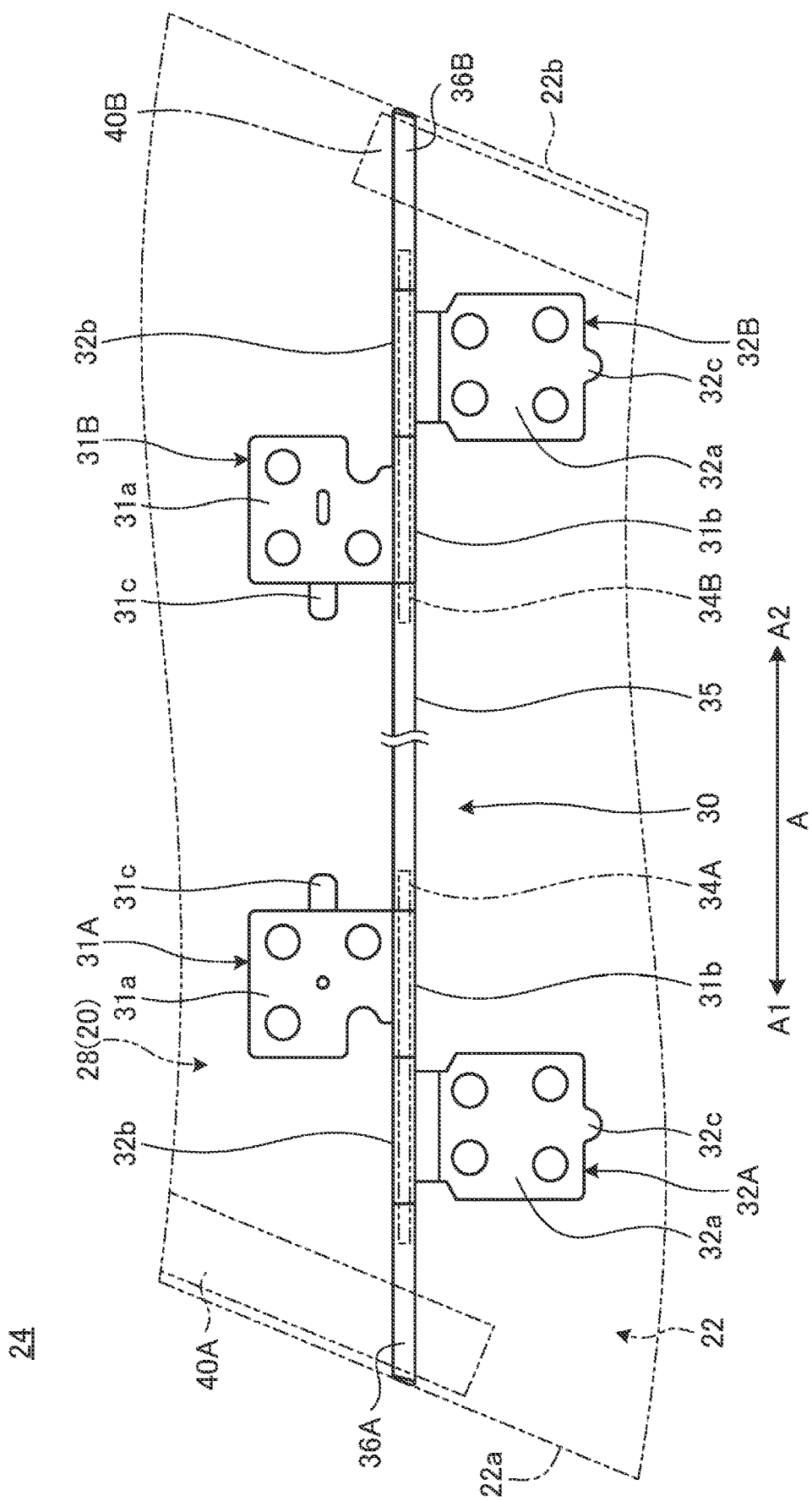
FIG. 5 is a schematic plan view of a hinge device.

FIG. 5 is a schematic plan view of the hinge device 24. The hinge device 24 couples the stand cover section 22 to be rotatable relative to the base cover section 20 and the second chassis 12B. As illustrated in FIG. 3 and FIG. 5, the hinge device 24 has a hinge shaft 30, base brackets 31A and 31B, and stand brackets 32A and 32B. In the hinge device 24 of the embodiment, a pair of brackets 31A and 32A and a pair of brackets 31B and 32B adjacent to each other are paired to constitute one hinge, respectively. Each pair of the base bracket and the stand bracket may also include three or more brackets.

The hinge shaft 30 is a metal rod-shaped member that intervenes between the fourth edge 22d of the stand cover section 22 and the edge 28a of the fixed cover section 28 to extend along these edges 22d and 28a. The hinge shaft 30 is inclined in the X-Y directions along the edges 22d and 28a.

As illustrated in FIG. 3, each of elements of the cover device 14 including the hinge device 24 will be described below by expressing an extension direction of the hinge shaft 30 as an A direction, a direction to approach the first side 25a in the A direction as an A1 direction, and a direction to approach the second side 25b in the A direction as an A2 direction. In other words, the edges 22d and 28a extend along the A direction.

As illustrated in FIG. 3 and FIG. 5, the base brackets 31A and 31B are mounting brackets for the second chassis 12B. Each of the base brackets 31A and 31B has a mounting plate 31a and a support cylinder 31b, respectively.

The mounting plate 31a is a metal plate formed into a substantially rectangular shape. The mounting plate 31a is fastened to the second chassis 12B with screws through holes and a notch provided, for example, in four places. The mounting plate 31a is coupled to the hinge shaft 30 through the support cylinder 31b. The base brackets 31A and 31B may be fixed directly to the base cover section 20 and fixed indirectly to the second chassis 12B. Reference numeral 31c in FIG. 5 denotes a plate piece for positioning the hinge device 24 with respect to the base cover section 20 (fixed cover section 28).

The support cylinder 31b is a mounting part of the mounting plate 31a to the hinge shaft 30. Each of shafts 34A and 34B that constitute part of the hinge shaft 30 is inserted into the support cylinder 31b in a state to be relatively rotatable. The mounting plate 31a is provided to protrude from the outer circumferential surface of the support cylinder 31b.

As illustrated in FIG. 3 and FIG. 5, the stand brackets 32A and 32B are mounting brackets for the stand cover section 22. Each of the stand brackets 32A and 32B has a mounting plate 32a and a support cylinder 32b, respectively.

The mounting plate 32a is a metal plate formed into a substantially rectangular shape. The mounting plate 32a is fixed to the stand cover section 22, for example, with adhesive. Holes and notches provided in the mounting plate 32a are cutout holes for the weight saving of the mounting plate 32a, which may be omitted. Reference numeral 32c in FIG. 5 denotes a plate piece for positioning the hinge device 24 to the stand cover section 22.

The support cylinder 32b is a mounting part of the mounting plate 32a to the hinge shaft 30. Each of the shafts 34A and 34B that constitute part of the hinge shaft 30 is inserted into the support cylinder 32b in a fixed state to be relatively unrotatable. The mounting plate 32a is provided to protrude from the outer circumferential surface of the support cylinder 32b.

Figure 6A:
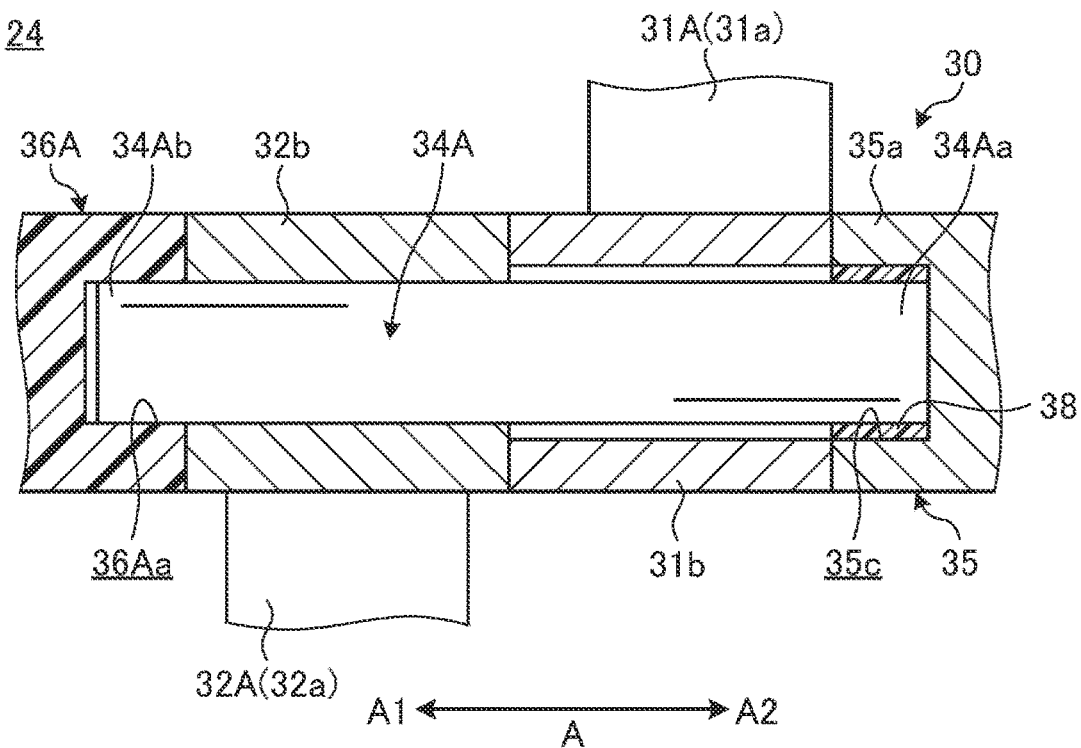
FIG. 6A is an enlarged sectional view of a section of a hinge shaft on an A1 side.
Figure 6B:
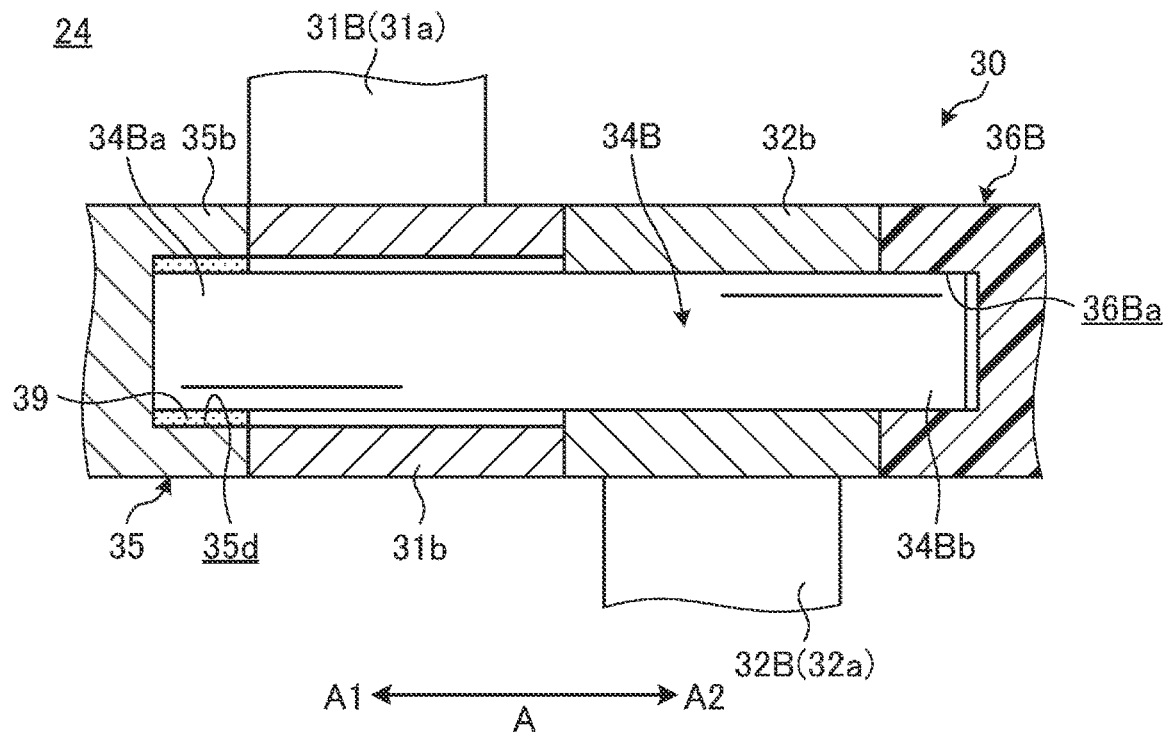
FIG. 6B is an enlarged sectional view of a section of the hinge shaft on an A2 side.

FIG. 6A is an enlarged sectional view of a section on the A1 side of the hinge shaft 30. FIG. 6B is an enlarged sectional view of a section on the A2 side of the hinge shaft 30. FIG. 6A and FIG. 6B are schematic sectional views of the hinge shaft 30 cut along a plane passing through a shaft center.

As illustrated in FIG. 3, and FIG. 5 to FIG. 6B, the hinge shaft 30 has a first shaft 34A, a second shaft 34B, an intermediate shaft 35, a first end shaft 36A, and a second end shaft 36B. The hinge shaft 30 is formed into a small-diameter round rod shape as a whole. The hinge shaft 30 has such a structure that the first end shaft 36A, the first shaft 34A, the intermediate shaft 35, the second shaft 34B, and the second end shaft 36B are lined up in this order from an A1-side end to an A2-side end.

The structure of each of the elements of the hinge shaft 30 will first be described.

As illustrated in FIG. 5 to FIG. 6B, the shafts 34A and 34B are metal round rods smaller in diameter than the intermediate shaft 35 and the end shafts 36A, 36B. The first shaft 34A extends in the A direction to couple between an A2-side end of the first end shaft 36A and an A1-side end (first end 35a) of the intermediate shaft 35. A central part of the first shaft 34A is inserted into the support cylinders 32b and 31b of the brackets 32A and 31A to support these brackets 32A and 31A.

The second shaft 34B is placed on an extension line of the axis of the first shaft 34A. The second shaft 34B extends in the A direction to couple between an A2-side end (second end 35b) of the intermediate shaft 35 and an A1-side end of the second end shaft 36B. A central part of the second shaft 34B is inserted into the support cylinders 31b and 32b of the brackets 31B and 32B to support these brackets 31B and 32B.

The intermediate shaft 35 is a metal round rod larger in diameter than the shafts 34A and 34B. The outer diameter of the intermediate shaft 35 is identical or almost identical to the outer diameter of the support cylinders 31b and 32b of the brackets 31A, 31B, and 32A, 32B. The intermediate shaft 35 is placed on an extension line of the axis of the first shaft 34A. The intermediate shaft 35 extends in the A direction to couple between an A2-side end 34Aa of the first shaft 34A and an A1-side end 34Ba of the second shaft 34B. As illustrated in FIG. 3, the intermediate shaft 35 is a part having the longest length in the axial direction (A direction) among the elements of the hinge shaft 30. Thus, sufficient spacing between the pair of brackets 31A, 32A and the pair of brackets 31B, 32B is secured by the intermediate shaft 35, and hence rattling or the like during the rotation of the stand cover section 22 is suppressed.

Each of the end shafts 36A and 36B is a round rod having an outer diameter identical or almost identical to that of the intermediate shaft 35. The end shafts 36A and 36B are placed on extension lines of the axes of the shafts 34A and 34B, respectively. The end shafts 36A and 36B of the embodiment are formed of a material capable of transmitting radio waves such as resin.

The hinge device 24 is installed in such a posture that the hinge shaft 30 is inclined with respect to the X-Y directions (see FIG. 3). Therefore, for example, the outermost stand brackets 32A and 32B on the A1 side and the A2 side cannot be arranged flush with the edges 22a and 22b. Therefore, gaps are formed at both ends in the A direction between the edges 22d and 28a, and the gaps are filled with the end shafts 36A and 36B to suppress the deterioration of the appearance of the cover device 14. For example, in such a structure that the hinge shaft 30 is placed along the X direction or the Y direction, the end shafts 36A and 36B may be omitted.

Next, the coupling structure of respective constituent elements of the hinge shaft 30 will be described.

As illustrated in FIG. 5 to FIG. 6B, the hinge shaft 30 is such that the A2-side end 34Aa of the first shaft 34A is coupled to the A1-side end (first edge 35a) of the central intermediate shaft 35, and the A1-side end 34Ba of the second shaft 34B is coupled to the A2-side edge (second edge 35b) of the intermediate shaft 35.

The intermediate shaft 35 has a shaft hole 35c open to an end face of the first end 35a, and a shaft hole 35d open to an end face of the second end 35b. The shaft holes 35c and 35d are formed coaxially with the shaft center of the intermediate shaft 35 and the shafts 34A, 34B. Each of the shaft holes 35c and 35d is a hole having an inner diameter slightly larger than the outer diameter of the end 34Aa, 34Ba of the shaft 34A, 34B, respectively.

The A2-side edge 34Aa of the first shaft 34A as a shaft pin is inserted into the shaft hole 35c, and the gap therebetween is fixed with an adhesive 38. On this occasion, the adhesive 38 is cured while managing the straightness of the shaft hole 35c and the A2-side end 34Aa by using a predetermined jig. This fixes the first shaft 34A and the intermediate shaft 35 to be unrotatable relative to each other in such a state that each other's straightness is set with predetermined high accuracy, thus becoming one shaft.

The A1-side edge 34Ba of the second shaft 34B as a shaft pin is inserted into the shaft hole 35d, and the gap therebetween is filled with a lubricant (grease) 39. This couples the second shaft 34B and the intermediate shaft 35 to be rotatable relative to each other in such a state that each other's straightness is set to a sufficient straightness though inferior to the case of the first shaft 34A, thus becoming one shaft. Note that, although FIG. 6A and FIG. 6B each illustrate the gap, formed between the inner circumferential surface of the shaft hole 35c, 35d and the outer circumferential surface of the end 34Aa, 34Ba, and provided with the adhesive 38 or the lubricant 39, to be exaggeratedly large, the gap is an imperceptible dimensional gap with a controlled dimensional tolerance in an actual product.

The first shaft 34A extends from the first end 35a of the intermediate shaft 35 toward the A1 side. The first shaft 34A supports the base bracket 31A and the stand bracket 32A in order from the A2-side end 34Aa toward the A1-side end 34Ab. The first shaft 34A is inserted into the support cylinder 31b of the base bracket 31A in a state to be relatively rotatable with a predetermined rotational torque. Then, the first shaft 34A is inserted into support cylinder 32b of the stand bracket 32A in a state to be relatively unrotatable.

The second shaft 34B extends from the second end 35b of the intermediate shaft 35 toward the A2 side. The second shaft 34B supports the base bracket 31B and the stand bracket 32B in order from the A1-side end 34Ba toward the A2-side end 34Bb. The second shaft 34B is inserted into the support cylinder 31b of the base bracket 31B in a state to be relatively rotatable with a predetermined rotational torque. Then, the second shaft 34B is inserted into the support cylinder 32b of the stand bracket 32B in a state to be relatively unrotatable. Note that, although FIG. 6A and FIG. 6B each illustrate an exaggerated gap between the inner circumferential surface of the support cylinder 31b and the outer circumferential surface of the shaft 34A, 34B, the shaft 34A, 34B is press-fitted into the support cylinder 31b to generate a sufficient rotational torque therebetween and hence no gap is formed in an actual product.

Thus, the base brackets 31A and 31B are coupled to be rotatable relative to the hinge shaft 30 with the predetermined rotational torque. The stand brackets 32A and 32B are fixed to the hinge shaft 30 to be rotated integrally with the hinge shaft 30 or the intermediate shaft 35. Thus, the hinge device 24 supports the stand cover section 22, to which the stand brackets 32A and 32B are fixed, to be rotatable with the predetermined rotational torque with respect to the second chassis 12B (fixed cover section 28) to which the base brackets 31A and 31B are fixed. As a result, the stand cover section 22 can be kept in the standing position at a desired angle to function as a kickstand of the portable information device 10 (see FIG. 4).

The first end shaft 36A is coupled to the A1-side end 34Ab of the first shaft 34A. The A1-side end 34Ab is press-fitted and fixed into a coupling hole 36Aa open to the A2-side end face of the first end shaft 36A. As described above, the first end shaft 36A is formed of a radio wave transmissive material. As illustrated in FIG. 6A, although the metal first shaft 34A is placed in the coupling hole 36Aa of the A2-side end of the first end shaft 36A, most of the first end shaft 36A on the A1 side is maintained in a state of being able to transmit radio waves.

Similarly, the A2-side edge 34Bb of the second shaft 34B is press-fitted and fixed into a coupling hole 36Ba open to an A1-side end face of the second end shaft 36B. Therefore, most of the second end shaft 36B on the A2 side of the coupling hole 36Ba is also maintained in the state of being able to transmit radio waves.

Next, the action of the hinge device 24 will be described.

As described above, the hinge shaft 30 is formed into a rod shape long in the A direction and small in diameter as a whole. The hinge shaft 30 supports the brackets 31A, 32A and the brackets 31B, 32B on both end sides in the A direction across the central intermediate shaft 35. As illustrated in FIG. 3 and FIG. 4, the stand cover section 22 is formed into a trapezoidal shape with the second edge 22b as the trapezoidal bottom longer than the first edge 22a as the trapezoidal top.

Therefore, when moving the stand cover section 22 from the stored position to the standing position, a user is expected to operate the stand cover section 22 while holding a corner between the third edge 22c and the second edge 22b of the stand cover section 22 and in the neighborhood thereof (see a region R indicate by a long dashed dotted line in FIG. 3 and FIG. 4). In other words, during the rotational movement from the stored position to the standing position, the region R is first lifted up and the stand cover section 22 is rotationally moved while being twisted and deformed as a whole. This is because the stand cover section 22 is a thin plate and hence cannot prevent the stand cover section 22 from being deformed such as distortion or curvature when twisted even if rigidity is sufficiently guaranteed.

Therefore, during the rotational movement of the stand cover section 22, the brackets 31B and 32B of the hinge device 24 close to the region R first rotate relative to each other. On the other hand, the brackets 31A and 32A located away greatly from the brackets 31B and 32B in the A1 direction start rotating relative to each other a little late from the start of rotation of the brackets 31B and 32B. In other words, a difference in rotational speed between the brackets 31B, 32B and the brackets 31A, 32A is caused, and the intermediate shaft 35 extending therebetween receives a twisting force between the second end 35b and the first end 35a.

Suppose here that both ends 35a and 35b of the intermediate shaft 35 are completely fixed to the shafts 34A and 34B with the adhesive 38. In this structure, the stand bracket 32B first starts rotating integrally with the second shaft 34B and the intermediate shaft 35 to rotate relative to the base bracket 31B at the same time. Then, the stand bracket 32A rotates relative to the base bracket 31A later than the rotation of the stand bracket 32B. On this occasion, the intermediate shaft 35 receives a rotational force from the stand bracket 32B to start rotating before the relative rotation of the brackets 31A and 32A. Therefore, a difference in rotational speed is caused between the first end 35a of the intermediate shaft 35 and the A2-side end 34Aa of the first shaft 34A. As a result, the adhesive 38 to fix the first end 35a and the A2-side end 34Aa is broken to cause rubbing sound (noise) due to a friction among the base bracket 31A, the first shaft 34A, and the intermediate shaft 35, deteriorating the product quality.

In this regard, in the hinge device 24 of the embodiment, the first shaft 34A and the intermediate shaft 35 are fixed with the adhesive 38, and the intermediate shaft 35 and the second shaft 34B are coupled through the lubricant 39 to be rotatable relative to each other. Therefore, in the embodiment, when the stand cover section 22 starts rotating, the stand bracket 32B first starts rotating integrally with the second shaft 34B to rotate relative to the base bracket 31B at the same time. On this occasion, when the rotating action of the bracket 31A, 32A side is delayed due to the deformation of the stand cover section 22, the second shaft 34B rotates relative to the intermediate shaft 35. As a result, even when the A1-side brackets 31A and 31B are slower in rotational speed than the A2-side brackets 31B and 32B in the hinge device 24, the speed difference is absorbed by the relative rotation between the second shaft 34B and the intermediate shaft 35. Thus, the hinge device 24 suppresses the generation of noise mentioned above. The lubricant 39 may not be provided in a coupling part of the intermediate shaft 35 and the second shaft 34B. However, it is preferred to provide the lubricant 39 in this coupling part considering further noise reduction effect and the like.

On the contrary to the above structure example, even if the first shaft 34A and the intermediate shaft 35 are coupled with the lubricant 39 to be rotatable relative to each other, and the intermediate shaft 35 and the second shaft 34B are fixed with the adhesive 38, the noise suppression effect can be obtained. However, in this structure, the intermediate shaft 35 rotates integrally with the second shaft 34B that is close to the region R and first starts rotating. Therefore, since there is a possibility to cause some rubbing between the first shaft 34A and base bracket 31A, which rotate later, and the intermediate shaft 35 in this structure, the above structure example is preferable. In other words, when the stand cover section 22 has the trapezoidal shape as mentioned above, the user is expected to operate the stand cover section while holding the trapezoidal bottom (second edge 22b) longer than the trapezoidal top (first edge 22a). Therefore, it is preferred to couple between the second shaft 34B located closer to this second edge 22b (region R) and the second end 35b of the intermediate shaft 35 to be rotatable relative to each other.

Next, the action of the structure in which the end shafts 36A and 36B are formed of the radio wave transmissive material will be described.

As illustrated in FIG. 3, wireless communication antenna devices 40A and 40B are installed inside the second chassis 12B. Each of the antenna devices 40A and 40B extends in the X direction along the side 25a, 25b of the second chassis 12B, respectively. The antenna device 40A, 40B extends in the X direction in a position facing the side 25a, 25b to ensure the installation space and good communication quality.

In the meantime, the metal hinges 19 are arranged in a central section of respective sides 25a and 25b (in positions across the adjacent edges 12Aa and 12Ba) of the portable information device 10 of the embodiment. Further, two pairs of metal magnets 42, 43 are arranged at four corners of the overall chassis 12A, 12B, respectively. The magnets 42, 42 (43, 43) attract each other when the chassis 12A and 12B are shaped into the folded form in order to suppress rattling between the chassis 12A and 12B.

Therefore, the antenna devices 40A and 40B are installed near the center of the second chassis 12B in the X direction in order to avoid metal parts (hinges 19 and magnets 42, 43) located on both edges in the X direction. As a result, it is difficult for the end shafts 36A and 36B of the hinge shaft 30 to avoid being placed in positions that overlap the antenna devices 40A and 40B in the plate thickness direction of the second chassis 12B.

Therefore, in the hinge device 24 of the embodiment, the end shafts 36A and 36B are made of resin, respectively, to suppress the influence of the end shafts 36A and 36B on the communication quality of the antenna devices 40A and 40B. As illustrated in FIG. 5, in the embodiment, the metal shafts 34A and 34B are located in positions that do not overlap the antenna devices 40A and 40B, and only the resin end shafts 36A and 36B are arranged in positions that overlap the antenna devices 40A and 40B, respectively. However, in such a structure that the hinge shaft 30 does not overlap the antenna devices 40A and 40B depending on the arrangement of the antenna devices 40A, 40B or the like, the end shafts 36A and 36B may be made of metal.

Next, a specific structure of the stand cover section 22 will be described.

Figure 7:
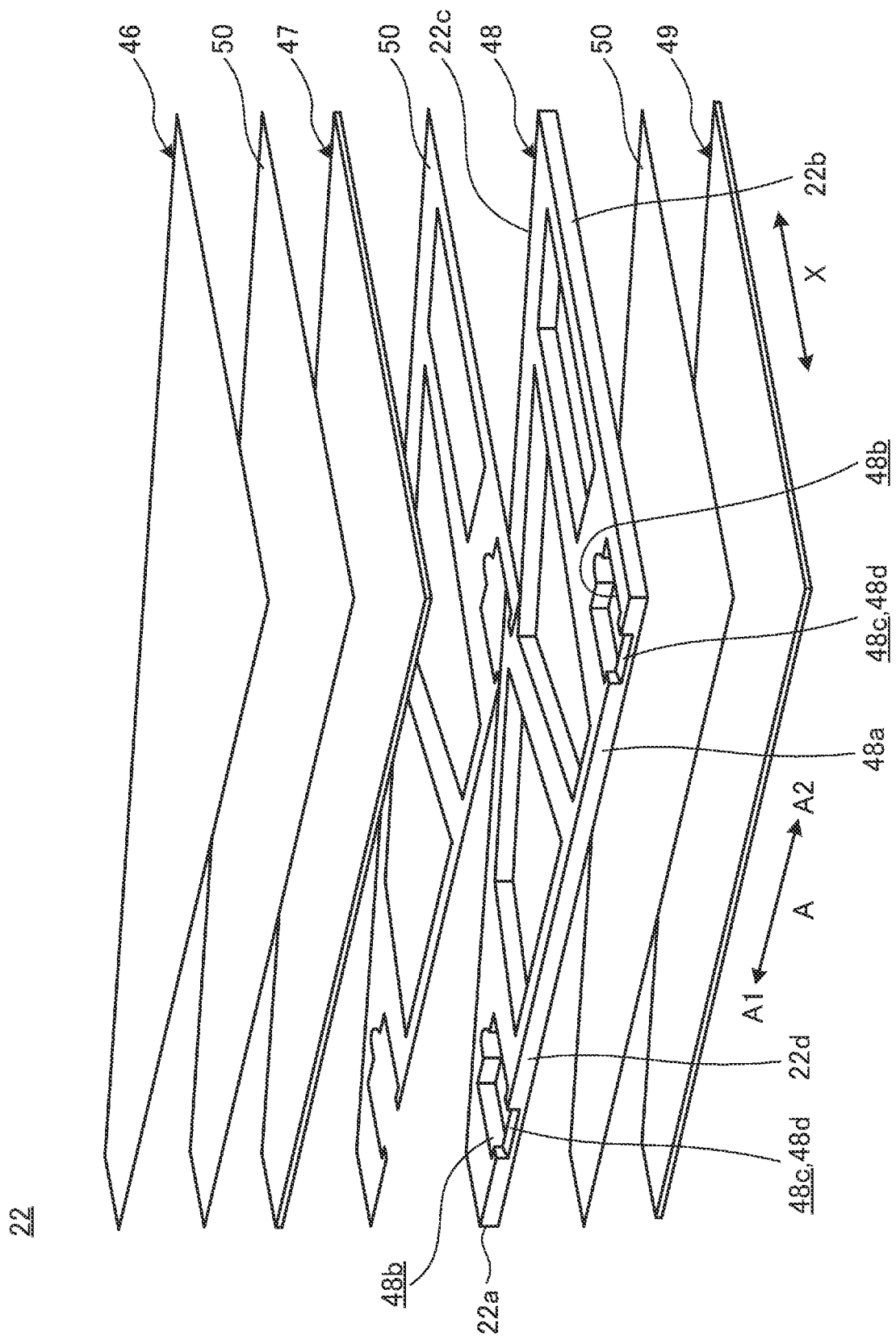
FIG. 7 is a schematic exploded perspective view of the stand cover section.

FIG. 7 is a schematic exploded perspective view of the stand cover section 22. As illustrated in FIG. 7, the stand cover section 22 has such a structure that a back material 46, an auxiliary sheet 47, a core material 48, and a surface material 49 are laminated in order from the back surface 12Bb of the second chassis 12B. Reference numeral 50 in FIG. 7 denotes an adhesive member formed of an adhesive or double-sided tape.

The back material 46 is an external covering material to enhance the appearance design and the sense of touch of the back of the stand cover section 22 that appears on the exterior in the standing position. The back material 46 is fixed with the adhesive member (fixing member) 50 and laminated on the back of the core material 48. The auxiliary sheet 47 is a sheet-shaped member laminated between the core material 48 and the back material 46. The core material 48 is a hard member as the base of the stand cover section 22, which is, for example, a resin plate. Cutout portions are formed for weight saving in various places of the core material 48. The surface material 49 is an external covering material to enhance the appearance design and the sense of touch of the stand cover section 22. The back material 46 and the surface material 49 are soft sheet-shaped members formed of artificial leather, natural leather, cloth, resin, or the like.

In the stand cover section 22, the edges 22a to 22c other than the fourth edge 22d, to which the hinge device 24 is connected, are covered by folding the edges of the surface material 49 to cover the end faces of the core material 48 in order to improve the design quality. On the other hand, since the hinge device 24 is connected to the fourth edge 22d, the surface material 49 cannot be provided on the fourth edge 22d. Therefore, an end face treatment agent 52 (see FIG. 9A) is provided on the end faces 48a and 49a of the core material 48 and the surface material 49 to ensure the design quality. Note that reference numerals 22a to 22d that denote the edges are given to the four peripheral end faces of the core material 48 in FIG. 7 for convenience.

As illustrated in FIG. 7, a pair of recesses 48b, 48b for positioning the stand brackets 32A, 32B is formed in the core material 48. Each recess 48b is a recessed hole formed by denting or cutting out the back of the core material 48 opposite to the surface of the core material 48 on the side of the surface material 49, which has a shape capable of positioning the stand bracket 32A, 32B. Each recess 48b has an opening 48c open to the fourth edge 22d. The stand bracket 32A, 32B protruding from the hinge shaft 30 is placed inside the recess 48b in such a state that a narrow root portion on the side of the hinge shaft 30 passes through the opening 48c.

Figure 8:
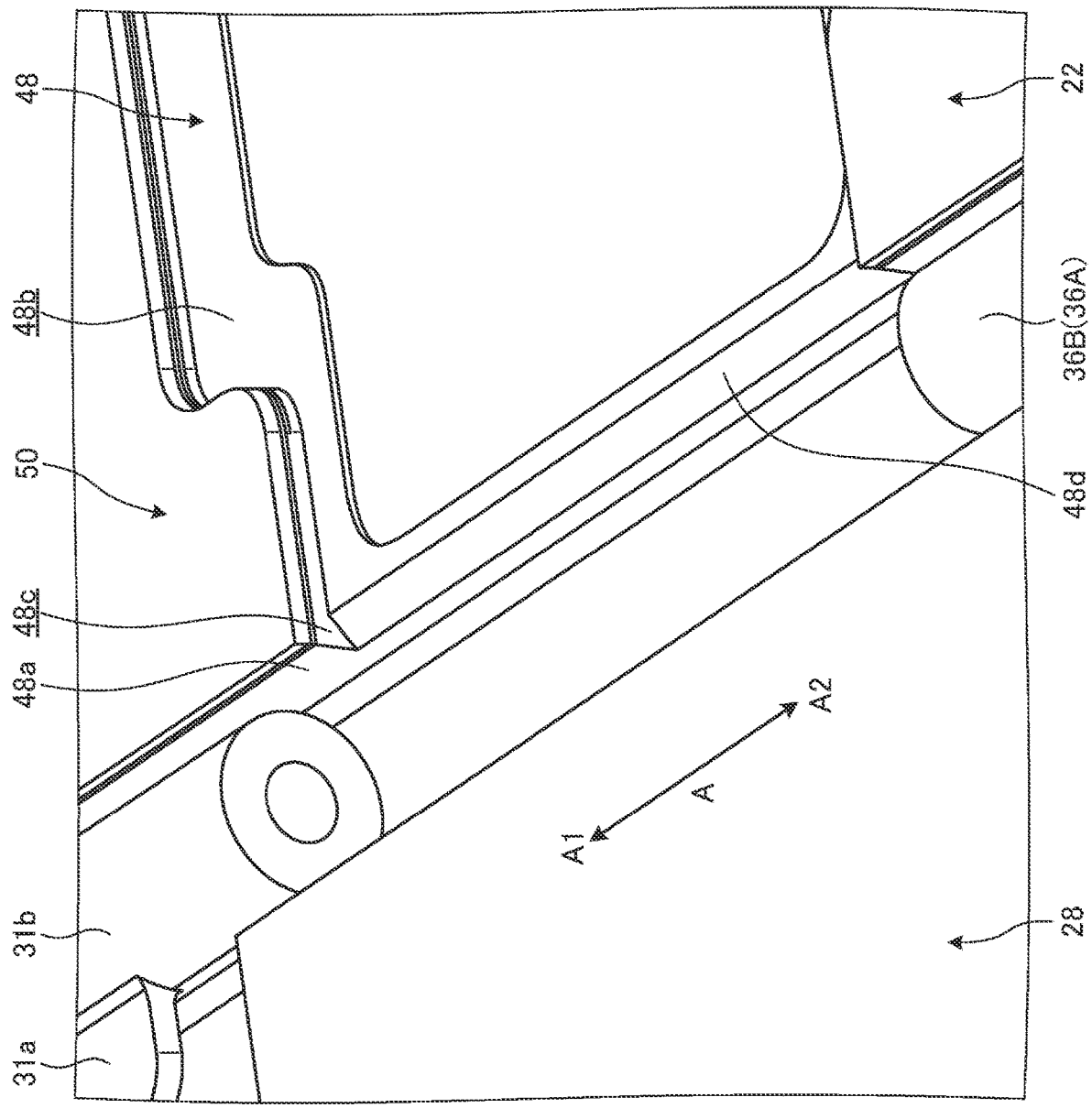
FIG. 8 is an enlarged perspective view of recesses of the stand cover section and the vicinity thereof.
Figure 9A:
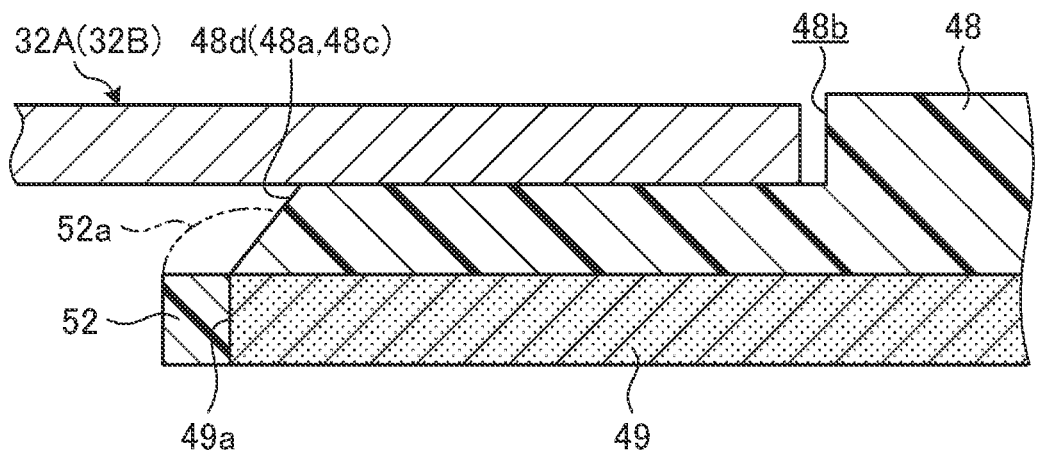
FIG. 9A is a schematic enlarged sectional view of a stand bracket of the stand cover section and the vicinity thereof.
Figure 9B:
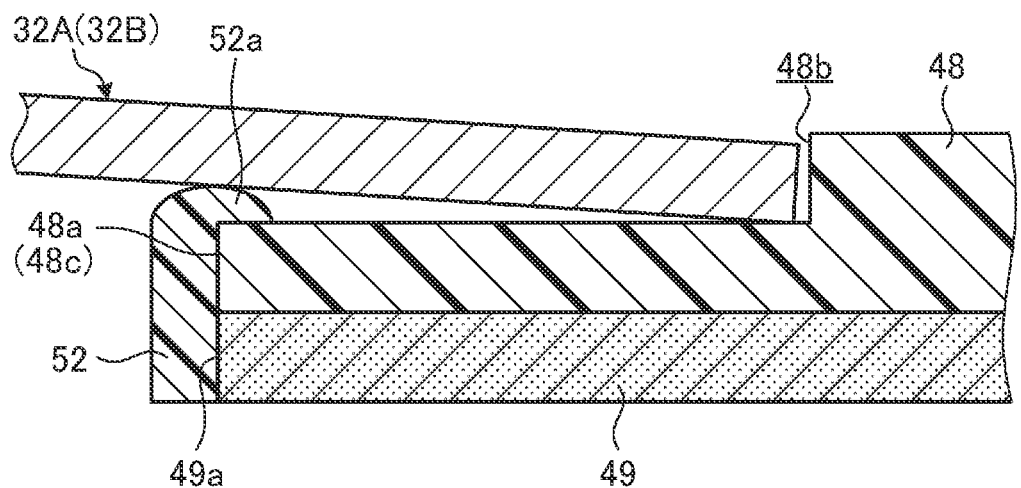
FIG. 9B is a schematic enlarged sectional view of the stand bracket of a stand cover section according to a comparative example and the vicinity thereof.

FIG. 8 is an enlarged perspective view of the recess 48b of the stand cover section 22 and the vicinity thereof. In FIG. 8, the stand bracket 32A (32B), the back material 46, the auxiliary sheet 47, and the like are omitted from the illustration. FIG. 9A is a schematic enlarged sectional view of the stand bracket 32A (32B) of the stand cover section 22 and the vicinity thereof. FIG. 9B is a schematic enlarged sectional view of the stand bracket 32A (32B) of a stand cover section 54 according to a comparative example and the vicinity thereof. FIG. 9A and FIG. 9B omit the back material 46, the auxiliary sheet 47, the adhesive member 50, and the like from the illustrations.

As illustrated in FIG. 8 and FIG. 9A, the stand cover section 22 of the embodiment has a chamfer-shaped portion 48d on an opening edge of the opening 48c of each recess 48b formed in the core material 48. The chamfer-shaped portion 48d is a tapered portion obtained by chamfering the corner of the opening edge of the opening 48c formed in a waterway shape. The chamfer-shaped portion 48d may also be formed in an R shape or the like.

As illustrated in FIG. 9A, the end face treatment agent 52 provided on the fourth edge 22d is a coating agent used for end face treatment (edge treatment) of general leather products, and called oil edge, edge oil, leather edge oil, leather edge paint oil, or the like. The end face treatment agent 52 is applied in liquid form to the end face 49a of the surface material 49 (and the end face 48a of the core material 48), and dried and cured to form leather-like coating.

In the meantime, suppose that the chamfer-shaped portion 48d is not provided in the opening 48c of the recess 48b like in the structure of the stand cover section 54 of the comparative example illustrated in FIG. 9B. In this case, there is a concern that the end face treatment agent 52 might be cured in a state of being overflown from the end face 48a up to the bottom of the recess 48b (opening 48c) (see part 52a). This is because it is difficult in the manufacturing process to apply the liquid end face treatment agent 52 accurately to the end faces 48a and 49a of the stand cover section 22 extremely thin at a few millimeters. As a result, the part 52a of the end face treatment agent 52 is cured inside the recess 48b in this stand cover section 54 and hence gets in the way to disable the stand bracket 32A (32B) from being accommodated completely inside the recess 48b, causing a concern about being installed in a tilted state. This causes the occurrence of rattling or the generation of noise in the hinge device 24.

In this regard, the stand cover section 22 of the embodiment is provided with the chamfer-shaped portion 48d in the opening 48c of the recess 48b. Therefore, when the end face treatment agent 52 is applied to the end face 49a of the surface material 49 in the manufacturing process, even if there is the part 52a somewhat overflown, this part 52a will not infiltrate into the recess 48b over the chamfer-shaped portion 48d. In other words, the process of applying the end face treatment agent 52 to the stand cover section 22 is easy, and poor application can be suppressed. As a result, the stand cover section 22 can suppress the occurrence of rattling or the generation of noise in the hinge device 24.

Note that the present invention is not limited to the aforementioned embodiment, and changes can be made freely without departing from the scope of the present invention.

In the above, the foldable portable information device is exemplified. However, when the portable information device is a tablet PC of a flat-plate type rather than of the folded type, the base cover section 20 of the cover device 14 may be formed by the fixed cover section 28 alone with the slide cover section 26 and the folding cover section 27 omitted.

In the above, since the second edge 22b of the stand cover section 22 matches the lower end face of the second chassis 12B that extends in the X direction, the hinge shaft 30 is arranged in a posture to be inclined with respect to the X-Y directions to cause the portable information device 10 to have a standing posture fallen a little backward in the standing position illustrated in FIG. 4. However, the hinge shaft 30 may also be placed in parallel in the X direction or the Y direction depending on the placement position of the stand cover section 22.

In the above, the structure in which the cover device 14 is fixed integrally to the chassis 12A and 12B is exemplified. However, the cover device 14 may also be a single part completely separated from the portable information device 10. In this case, the cover device 14 may be removably mounted on the chassis 12A and 12B, for example, using a magnet or a hook. In such a cover device 14, the base brackets 31A and 31B may be fixed to the core material 34 of the fixed cover section 28.

In the above, the structure in which the base brackets 31A and 31B on the side of the base cover section 20 rotate relative to the hinge shaft 30, and the stand brackets 32A and 32B on the side of the stand cover section 22 are fixed to the hinge shaft 30 is exemplified, but this mounting relationship may be reversed. In other words, the hinge device 24 may also have such a structure that the base brackets 31A and 31B are fixed to the hinge shaft 30 and the stand brackets 32A and 32B rotate relative to the hinge shaft 30.

In the above, the structure in which the ends of the shafts 34A and 34B are inserted as shaft pins into the shaft holes 35c and 35d of the intermediate shaft 35 is exemplified, but this relationship may also be changed. In other words, the hinge shaft may also have such a structure that a shaft hole(s) is formed in either one or both of the shafts 34A and 34B, and a shaft pin(s) is formed on either one or both of the ends 35a and 35b of the intermediate shaft 35.

In the above, the portable information device 10 foldable in half like a book is exemplified. However, in addition to the structure in which the same shaped chassis are folded in half, various structures can be exemplified as foldable portable information devices, such as a double-door structure in which two small-sized chassis are coupled to the right and left edges of a large-sized chassis in a foldable manner, an S-shaped folding structure in which two chassis different in folding direction from each other are coupled to the right and left edges of one chassis, and a J-shaped folding structure in which two small-sized chassis are coupled to one of the right and left edges of a large-sized chassis in a foldable manner, and the number of coupled chassis may be four or more. In this case, the cover device 14 may have such a structure as to cover the whole or part of the back surface of each chassis, and two or more chassis may be used simultaneously.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 10 portable information device
12A first chassis
12B second chassis
14 cover device
16 display
20 base cover section
22 stand cover section
24 hinge device
26 slide cover section
27 folding cover section
28 fixed cover section
30 hinge shaft
31A, 31B base bracket
32A, 32B stand bracket
34A first shaft
34B second shaft
35 intermediate shaft
36A first end shaft
36B second end shaft
38 adhesive
39 lubricant
40A, 40B antenna device
48 core material
48d chamfer-shaped portion
52 end face treatment agent

What is claimed is:

1. A portable information device comprising:
a chassis; and
a cover device that covers a back surface of the chassis, wherein
the cover device includes:
a base cover section along the back surface of the chassis;
a stand cover section that rotates, relative to the base cover section, between:
a stored position where the stand cover section is set along the back surface of the chassis, and
a standing position where the stand cover section protrudes from the back surface of the chassis; and
a hinge device that supports the stand cover section to be rotatable between the stored position and the standing position,
the hinge device includes:
a first shaft;
a second shaft on an extension line of an axis of the first shaft;
an intermediate shaft on an extension line of an axis between the first shaft and the second shaft, wherein the intermediate shaft includes a first end coupled to one end of the first shaft and a second end coupled to one end of the second shaft;
a first base bracket coupled to the first shaft and fixed relative to the base cover section;
a first stand bracket coupled to the first shaft adjacently to the first base bracket and fixed to the stand cover section;
a second base bracket coupled to the second shaft and fixed relative to the base cover section; and
a second stand bracket coupled to the second shaft adjacently to the second base bracket and fixed to the stand cover section,
one of the first base bracket or the first stand bracket is coupled to be rotatable around the axis of the first shaft, and the other is fixed to the first shaft,
when the first base bracket is coupled to be rotatable around the axis of the first shaft, the second base bracket is also coupled to be rotatable around an axis of the second shaft, and when the first base bracket is fixed to the first shaft, the second base bracket is also fixed to the second shaft, or when the first stand bracket is fixed to the first shaft, the second stand bracket is also fixed to the second shaft, and when the first stand bracket is coupled to be rotatable around the axis of the first shaft, the second stand bracket is also coupled to be rotatable around the axis of the second shaft,
the first end of the intermediate shaft is fixed to the one end of the first shaft, and
the second end of the intermediate shaft is coupled to be rotatable relative to the one end of the second shaft.

2. The portable information device according to claim 1, wherein
the first end of the intermediate shaft and the one end of the first shaft are fixed to each other with an adhesive in a state where a first shaft pin provided on one side is inserted into a first shaft hole provided on the other side, and
the second end of the intermediate shaft and the one end of the second shaft are coupled to be rotatable relative to each other using a lubricant in a state where a second shaft pin provided on one side is inserted into a second shaft hole provided on the other side.

3. The portable information device according to claim 1, wherein
the chassis has a rectangular external shape, and
the stand cover section has:
a first edge and a second edge extending along a first side and a second side of the chassis parallel with each other;
a third edge extending between a first end of the first edge and a first end of the second edge, and extending along a third side orthogonal to the first side and the second side of the chassis; and
a fourth edge extending between a second end of the first edge and a second end of the second edge, wherein
the hinge device is connected to the fourth edge.

4. The portable information device according to claim 3, wherein
   a length of the second edge is longer than a length of the first edge to cause the fourth edge to extend in a posture to be inclined with respect to the third edge,
   an axial direction of each of the first shaft, the second shaft, and the intermediate shaft of the hinge device is placed in a posture to be crossed over the first side and the second side of the chassis, respectively, and
   the first end of the intermediate shaft is closer to the first edge than the second edge, and
   the second end of the intermediate shaft is closer to the second edge than the first edge.

5. The portable information device according to claim 3, wherein
   the stand cover section includes:
      a core material;
      a surface material laminated on a surface of the core material to form a surface of the stand cover section; and
      an end face treatment agent provided on an end face of the fourth edge and obtained by curing a liquid coating agent,
   the core material has:
      a first recess on a back surface opposite to the surface, on which the surface material is laminated, wherein the back surface is open to the fourth edge and the first stand bracket is disposed in the first recess; and
      a second recess on the back surface to be open to the fourth edge, wherein the second stand bracket is disposed in the second recess, and
   each of the first recess and the second recess has a chamfer-shaped portion at a corner of an opening to the fourth edge.

6. The portable information device according to claim 3, wherein
   a first antenna device is disposed in the chassis along the first side and a second antenna device is disposed in the chassis along the second side,
   the hinge device further includes:
      a first end shaft coupled to the other end of the first shaft and that overlaps the first antenna device in a plate thickness direction of the chassis; and
      a second end shaft coupled to the other end of the second shaft and that overlaps the second antenna device in the plate thickness direction of the chassis, and
   each of the first end shaft and the second end shaft is formed of a radio wave transmissive material that transmits radio waves.

7. A portable information device comprising:
   a chassis; and
   a cover device that covers a back surface of the chassis, wherein
   the cover device includes:
      a base cover section along the back surface of the chassis;
      a stand cover section that rotates, relative to the base cover section, between:
         a stored position where the stand cover section is set along the back surface of the chassis, and
         a standing position where the stand cover section protrudes from the back surface of the chassis; and
      a hinge device that supports the stand cover section to be rotatable between the stored position and the standing position,
   the hinge device includes:
      a hinge shaft;
      a first base bracket coupled to the hinge shaft and fixed to the base cover section;
      a first stand bracket coupled to the hinge shaft adjacently to the first base bracket and fixed to the stand cover section;
      a second base bracket coupled to the hinge shaft and fixed relative to the chassis; and
      a second stand bracket coupled to the hinge shaft adjacently to the second base bracket and fixed to the stand cover section,
   one of a set of the first base bracket and the second base bracket or a set of the first stand bracket and the second stand bracket is coupled to be rotatable around an axis of the hinge shaft and the other is fixed to the hinge shaft,
   the stand cover section includes:
      a core material;
      a surface material laminated on a surface of the core material to form a surface of the stand cover section; and
      an end face treatment agent provided on an end face of an edge, to which the hinge device is connected, and obtained by curing a liquid coating agent,
   the core material has:
      a first recess on a back surface opposite to the surface, on which the surface material is laminated, wherein the back surface is open to the edge and the first stand bracket is disposed in the first recess; and
      a second recess on the back surface to be open to the edge, wherein the second stand bracket is disposed in the second recess, and
   each of the first recess and the second recess has a chamfer-shaped portion at a corner of an opening to the edge.

8. A cover device configured to cover a back surface of a chassis of a portable information device, comprising:
   a base cover section;
   a stand cover section that rotates relative to the base cover section; and
   a hinge device that supports the stand cover section to be rotatable relative to the base cover section, wherein
   the hinge device includes:
      a first shaft;
      a second shaft on an extension line of an axis of the first shaft;
      an intermediate shaft on an extension line of an axis between the first shaft and the second shaft, and having a first end coupled to one end of the first shaft and a second end coupled to one end of the second shaft;
      a first base bracket coupled to the first shaft and fixed relative to the base cover section;
      a first stand bracket coupled to the first shaft adjacently to the first base bracket and fixed to the stand cover section;
      a second base bracket coupled to the second shaft and fixed relative to the base cover section; and
      a second stand bracket coupled to the second shaft adjacently to the second base bracket and fixed to the stand cover section,
   one of the first base bracket or the first stand bracket is coupled to be rotatable around the axis of the first shaft, and the other is fixed to the first shaft,
   when the first base bracket is coupled to be rotatable around the axis of the first shaft, the second base bracket is also coupled to be rotatable around an axis of the second shaft while when the first base bracket is fixed to the first shaft, the second base bracket is also fixed to the second shaft, or when the first stand bracket is fixed to the first shaft, the second stand bracket is also fixed to the second shaft while when the first stand bracket is coupled to be rotatable around the axis of the first shaft, the second stand bracket is also coupled to be rotatable around the axis of the second shaft, the first end of the intermediate shaft is fixed to the one end of the first shaft, and the second end of the intermediate shaft is coupled to be rotatable relative to the one end of the second shaft.

9. The cover device according to claim 8, wherein the first end of the intermediate shaft and the one end of the first shaft are fixed with an adhesive each other in a state where a first shaft pin provided on one side is inserted into a first shaft hole provided on the other side, and the second end of the intermediate shaft and the one end of the second shaft are coupled to be rotatable relative to each other using a lubricant in a state where a second shaft pin provided on one side is inserted into a second shaft hole provided on the other side.

* * * * *